United States Patent [19]

Connerley

[11] Patent Number: 4,805,968
[45] Date of Patent: Feb. 21, 1989

[54] VEHICLE TRACK SHOE WITH REINFORCING GROUSER

[75] Inventor: James J. Connerley, Georgetown, Ky.

[73] Assignee: FMC Corporation, Chicago, Ill.

[21] Appl. No.: 875,029

[22] Filed: Jun. 16, 1986

[51] Int. Cl.$^4$ ............................................. B62D 55/20
[52] U.S. Cl. ...................................... 305/39; 305/57; 305/58 R; 305/13
[58] Field of Search ................ 305/42, 53, 58 PC, 13, 305/39, 57, 58 R

[56] References Cited

U.S. PATENT DOCUMENTS

| | | | |
|---|---|---|---|
| 2,350,445 | 6/1944 | Burgess | 305/42 |
| 2,392,383 | 1/1946 | Hollenkamp | 305/42 X |
| 3,357,750 | 12/1967 | Reynolds et al. | 305/11 |
| 4,435,022 | 3/1984 | Whitelaw | 305/53 |

FOREIGN PATENT DOCUMENTS 365604 1/1932 United Kingdom ................... 305/42

*Primary Examiner*—Robert B. Reeves
*Assistant Examiner*—Joseph D. Pape
*Attorney, Agent, or Firm*—Raymond E. Parks; Lloyd B. Guernsey; Richard B. Megley

[57] ABSTRACT

A strong, light-weight track shoe for use with a track-laying vehicle. The shoe includes a cast body portion having three bored lug segments spaced along the front of the shoe and a pair of bored lug segments spaced along the rear of the shoe. The cast body portion has a fin-like guide member for engagement with sprocket and bogey wheels. Pairs of reinforcing ribs extend lengthwise along the shoe which form the longitudinal sides of sprocket tooth engaging openings. A single grouser extends along the width of the shoe to reinforce the body portion and to provide traction between the shoe and ground as the vehicle moves along a terrain. The grouser member and the rear lugs form the leading sides and the trailing sides of the sprocket tooth openings, respectively.

2 Claims, 3 Drawing Sheets

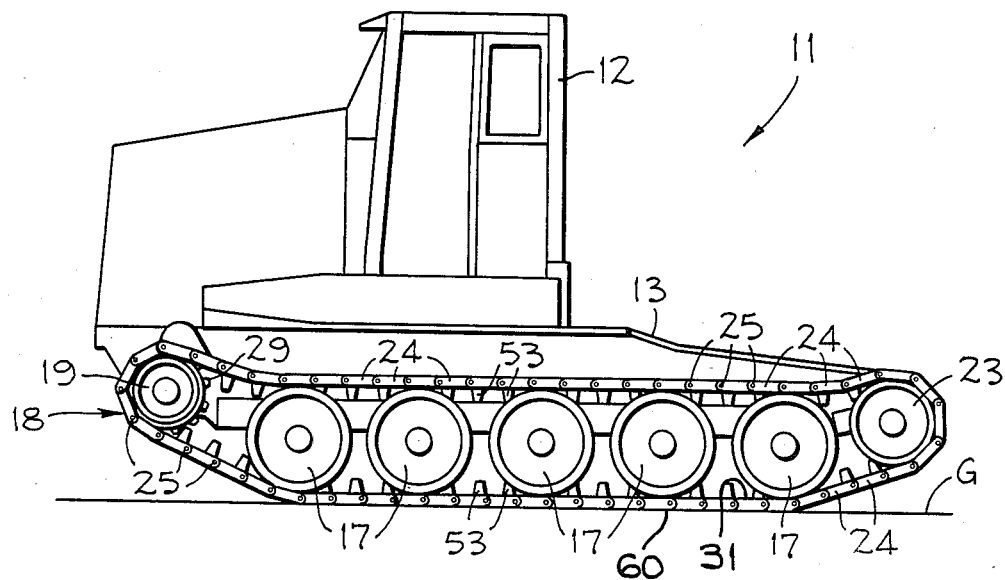
FIG_1
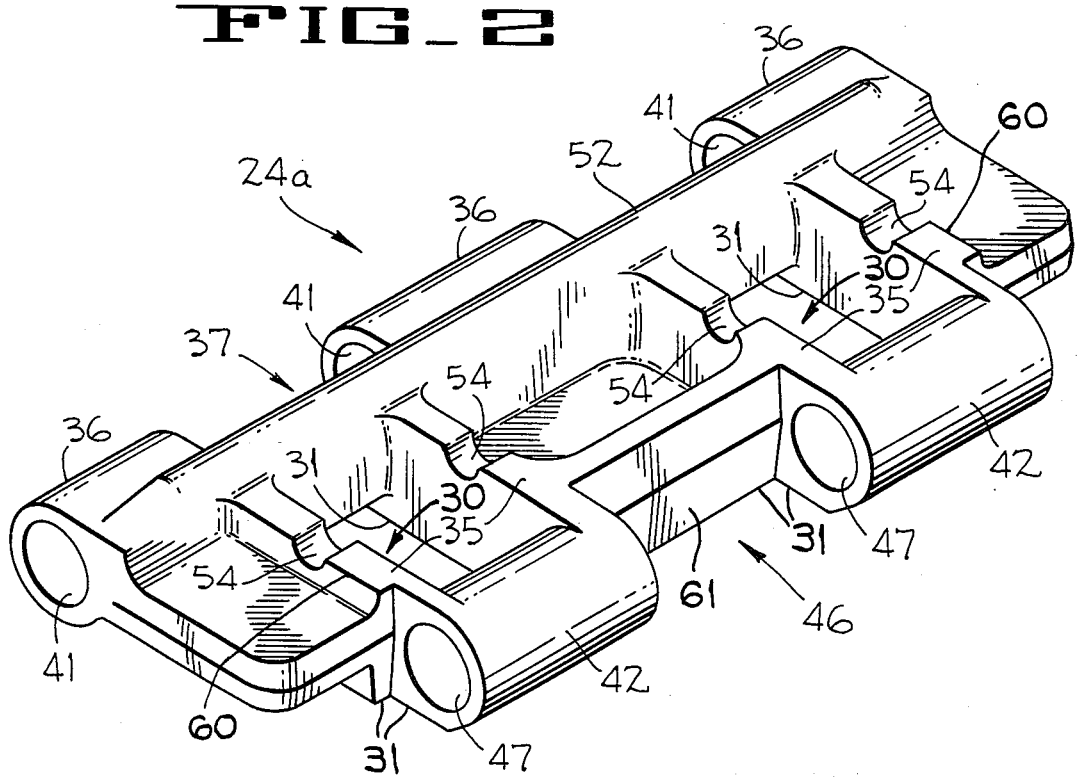
FIG_2

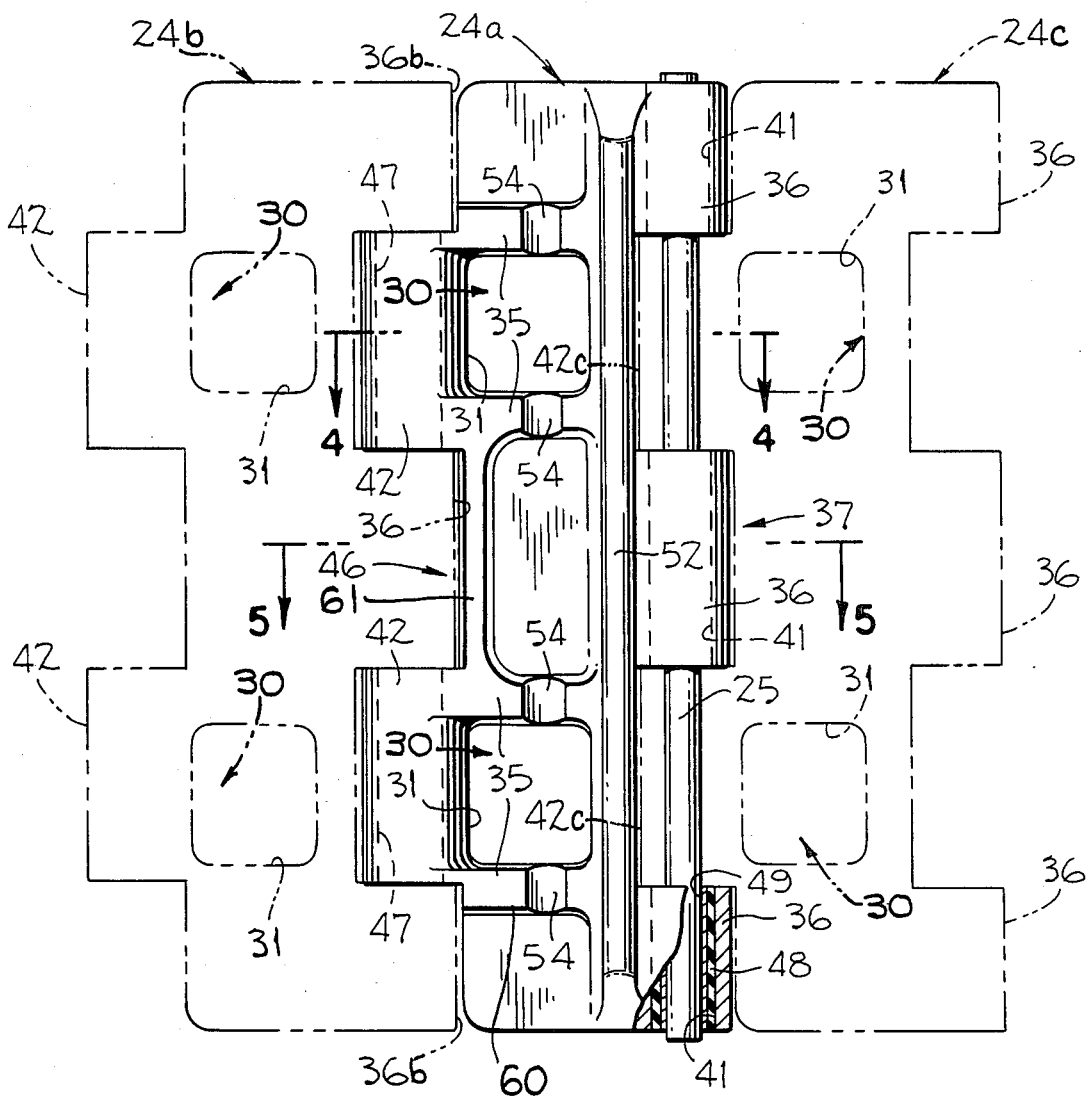
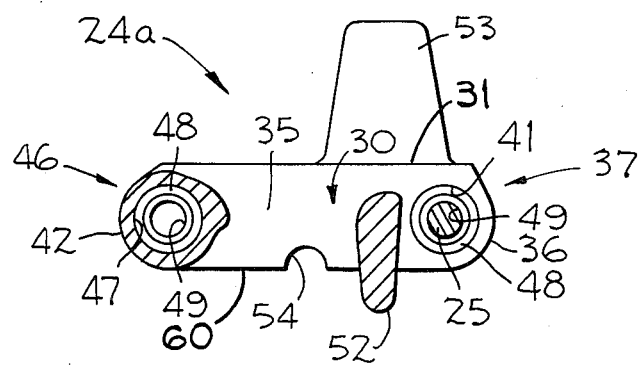

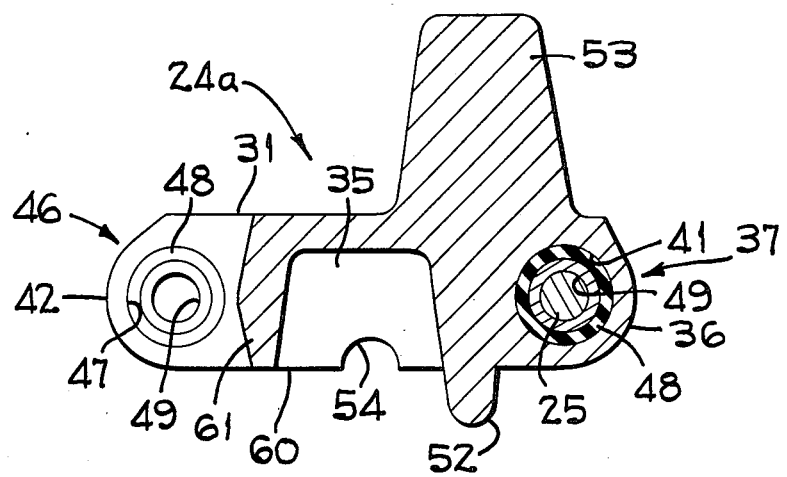
FIG_5

VEHICLE TRACK SHOE WITH REINFORCING GROUSER

BACKGROUND OF THE INVENTION

The present invention pertains to track-laying vehicles, and more particularly, to an improved track shoe for use on track laying vehicles.

Track-laying crawler vehicles, such as crawler cranes each use a pair of endless tracks which provide a large area of support contact with the terrain so the vehicles can be used on relatively soft ground. The tracks comprise a series of segments or shoes pivotally interconnected by a plurality of pivot pins mounted in bushings in the shoes. Prior art shoes are rough cast, then portions, such as holes for bushings are machined to proper size. Such a manufacturing procedure is time consuming and expensive.

SUMMARY OF THE INVENTION

The present invention reduces the time and expense of making track shoes by disclosing a track shoe which can be cast with holes to receive the interconnecting pivot pin without the need for additional machining. The track shoe includes a body portion having a pair of openings for engaging the teeth of a drive sprocket which moves the track-laying vehicle along a terrain. A plurality of ribs adjacent the openings in the body portion reinforce the body portion along the length of the shoe. A single grouser extending along the width of the shoe reinforces the shoe and increases traction between the shoe and ground to move the vehicle along the terrain. A plurality of bored forward lugs are spaced along the front of the body portion and another plurality of bored rear lugs connected together by one of the plurality or ribs are spaced along the rear portion of the body portion to interweave with forward lugs of an adjacent track shoe. Bores in the forward and rear lugs of adjacent shoes are aligned to receive a pivot pin which extends through bores in the interleaved lugs to pivotally interconnect the adjacent shoes. The grouser and ribs on the body portion of the track shoe provide added strength so that a relatively thin light-weight shoe can be used.

BRIEF DESCRIPTION OF THE DRAWINGS

FIG. 1 is a diagrammatic drawing of a track-laying vehicle which uses the track shoe of the present invention.

FIG. 2 is an isometric drawing of the track shoe of the present invention.

FIG. 3 is a to view of the track shoe of the present invention.

FIG. 4 is a sectional view taken along line 4—4 of the track shoe of FIG. 3.

FIG. 5 is a sectional view taken along a median center line 5—5 extending lengthwise of the track shoe of FIG. 3.

DESCRIPTION OF THE PREFERRED EMBODIMENT

A track-laying vehicle 11 of FIG. 1 includes a cab 12 and a body portion 13 supported by a plurality of bogey wheels 17. The vehicle is propelled across the ground G by a pair of endless tracks 18 (only one shown) with each track 18 driven by a drive sprocket 19. The track 18 moves in an orbit about bogey wheels 17, drive sprocket 19 and an idler wheel 23 in a manner well known in the art. The track 18 includes a plurality of track shoes 24 of the present invention interconnected by a plurality of pivot pins 25. The drive sprocket 19 includes a plurality of radially extending teeth 29 for projecting into a pair of openings 30 (FIG. 2) in each of track shoes 24 for moving the track 18 about drive sprocket 19 and wheels 17, 23 (FIG. 1).

A track shoe 24a (FIGS. 1, 2) is drawn with the ground-contacting portion 60 of the shoe facing upward in order to show details of the present invention. The shoe (FIGS. 2, 4 and 5) includes a sprocket and bogey wheels contacting flat body portion 31 having the generally rectangular openings 30 therein. Two pairs of ribs 35 extend generally lengthwise of the shoe 24a with a rib 35 adjacent to either side of each opening 30. A plurality of bore forward lugs 36 are spaced along a front portion 37 of shoe 24a with each lug 36 having a bore 41 extending through the length of the lug. A pair of bored rear lugs 42 are spaced along a rear portion 46 of shoe 24a with each lug 42 having a bore 47 extending through the length of the lug. The forward lugs 36 of the shoe 24a are spaced to interweave with adjacent front and rear lug segments 36b and 24c shown in dash-dot lines which are positioned on opposite longitudinal sides of the track shoe 24a shown in solid lines in FIG. 3. A bushing 48 (FIGS. 3, 4) having a central bore 49 is inserted into each of the bores 41, 47 with bores 49 aligned to receive the pivot pin 25 to interconnect shoes 24a, 24b and 24c.

A grouser 52 (FIGS. 2-4) extends transversely across each of the shoes 24 immediately behind the forward lugs 36. The grouser 52 extends vertically outward from the body portion 31 to provide reinforcement of the body portion 31 and to provide traction between the ground G (FIG. 1) and the endless track 18. The fact that the grouser 52 extends substantially across the full width of the shoe causes the shoe to be much stouter and forms a solid mass at the cross-section extending along the median center line shown in FIG. 5. The reinforcement provided by grouser 52 allows the shoes to be made thinner and lighter in weight while providing strength to prevent breakage of the shoes. An outwardly extending fin-like guide lug 53 (FIGS. 1, 4) and extending lengthwise on the median line on each shoe 24 serves to maintain the track 18 in a predetermined orbital plane through the wheels 17, 23 and drive sprocket 19. A notch 54 in each of the ribs 35 (FIGS. 2, 4) facilitates the use of a bushing-changing tool (not shown) which can be used in the field of operations to remove and replace bushings 48 (FIGS. 3, 4) which are worn or damaged.

Thus, the grouser member 52 and the three front lug segments 36 and the transverse rib 61 provide strength in the transverse direction, across the width of the shoe, and reinforcing ribs 35, together with the grouser member 52, the middle front lug segment 35 and the guide member 52 provide strength and a solid cast mass between the front middle lug segment 36 and the leading sides of the openings 30 and extending upwardly into the dorsal fin-like guide member 53. of the shoe to define a strong, light-weight shoe. The entire shoe, including the holes 41, 47, can be cast and bushings 48 inserted to accommodate pivot pins 25 which interconnect shoes 24.

Although the best mode contemplated for carrying out the present invention has been herein shown and described, it will be apparent that modification and variation may be made without departing from what is regarded to be the subject matter of the invention.

What is claimed is:

1. A one piece cast track shoe having a flat body portion (31) formed with three front and two rear laterally spaced apart apertured pivot pin and bushing receiving lug segments (36, 42), the two rear lug segments symmetrically spaced apart on opposite sides of a median line passing lengthwise through the track shoe for interweaving between three front lug segments on an identical track shoe for constructing an endless crawler track, the flat body portion formed with a lengthwise fin-like guide member (53) on the median line for guiding sprocket and bogey wheels over the flat body portion, the guide member positioned over the middle front lug segment of the three front lug segments when the track shoe is in a ground engaging position, a grouser member (52) formed on a ground contacting side (60) of the track shoe and extending laterally and positioned rearwardly of the three front lugs and below the guide member when the track shoe is in the ground engaging position, pairs of laterally spaced reinforcing ribs symmetrically positioned on opposite sides of the median line and forming longitudinal sides of a pair of sprocket tooth receiving openings (30) in the flat body portion, the grouser member forming a leading side of the openings and the two rear lug segments forming a trailing side of the openings, a transverse reinforcing rib (61) extending across the lateral space between the two rear lug segments connecting the pairs of ribs at the trailing ends of the openings, the grouser member connecting the pairs of ribs at the leading ends of the openings, the grouser member together with the guide member and the middle front lug segment forming a solid cast mass, when the track shoe is in the ground engaging position extending upwardly into the guide member and rearwardly to the leading sides of the openings when the track shoe is in the ground engaging position, thereby reinforcing the flat body portion on lateral opposite sides of the guide member.

2. The one piece cast track shoe (24a), as claimed in claim 1, in combination with a plurality of identical track shoes (24b, 24c) interweaved and pivot pin connected together forming an endless crawler track (18).

* * * * *